US012784050B2

(12) United States Patent
Elloumi et al.

(10) Patent No.: US 12,784,050 B2
(45) Date of Patent: Nov. 3, 2026

(54) METHOD FOR STRONG ASYNCHRONOUS AUTHENTICATION AND TERMINAL CONFIGURED TO IMPLEMENT SAID METHOD

(71) Applicant: WORLDLINE, Puteaux (FR)

(72) Inventors: Wael Elloumi, Blois (FR); Loïc Bidoux, Lille (FR); Guillaume Lefebvre, Meurchin (FR)

(73) Assignee: WORLDLINE SA, Bezons (FR)

( * ) Notice: Subject to any disclaimer, the term of this patent is extended or adjusted under 35 U.S.C. 154(b) by 87 days.

(21) Appl. No.: 18/686,523

(22) PCT Filed: Jul. 27, 2022

(86) PCT No.: PCT/FR2022/051513
§ 371 (c)(1),
(2) Date: Feb. 26, 2024

(87) PCT Pub. No.: WO2023/026002
PCT Pub. Date: Mar. 2, 2023

(65) Prior Publication Data

US 2024/0428246 A1 Dec. 26, 2024

(30) Foreign Application Priority Data

Aug. 25, 2021 (FR) ..................................... 21/08902

(51) Int. Cl.
*G06Q 20/40* (2012.01)
*G06F 21/32* (2013.01)
(Continued)

(52) U.S. Cl.
CPC ... *G06Q 20/40145* (2013.01); *G06Q 20/3825* (2013.01); *G06Q 20/3829* (2013.01); *G06F 2221/2111* (2013.01); *G06Q 20/3224* (2013.01)

(58) Field of Classification Search
CPC ......... G06Q 20/40145; G06Q 20/3825; G06Q 20/3829; G06Q 20/3224;
(Continued)

(56) References Cited

U.S. PATENT DOCUMENTS 11,622,257 B1 * 4/2023 Mars ...................... A61B 5/746
455/41.2
2008/0209545 A1 8/2008 Asano
(Continued)

FOREIGN PATENT DOCUMENTS

FR 2864289 A1 6/2005

OTHER PUBLICATIONS

Ratha et al. "Enhancing security and privacy in biometrics-based authentication systems", IBM Systems Journal, vol. 40, No. 3, Nov. 3, 2009, pp. 614-634 (Year: 2009).*
(Continued)

*Primary Examiner* — James D Nigh
(74) *Attorney, Agent, or Firm* — CANTOR COLBURN LLP

(57) ABSTRACT

An authentication method using a first authentication factor and a second biometric authentication factor, the authentication device having a server(s) and an authentication terminal, including a device for acquiring user biometric information, the user terminal storing a reference biometric template of the user and an identifier of the user, the method involving the following asynchronous steps: transmitting the identifier of the user to the server(s) when a first communication condition dependent on a position of the user terminal is met, receiving by the user terminal a challenge originating from the sever(s), signing the challenge to produce a signed challenge, encrypting the reference biometric template, transmitting the signed challenge, the cipher of the
(Continued)

reference biometric template and the identifier of the user to the at least one authentication terminal.

15 Claims, 1 Drawing Sheet

(51) Int. Cl.

| | |
|---|---|
| ***G06Q 20/32*** | (2012.01) |
| ***G06Q 20/38*** | (2012.01) |
| ***H04L 9/32*** | (2006.01) |
| ***H04L 9/40*** | (2022.01) |
| ***H04W 12/06*** | (2021.01) |
| ***H04W 12/72*** | (2021.01) |

(58) Field of Classification Search
CPC ............. G06F 2221/2111; G06F 21/32; H04L 9/3271; H04L 2463/082; H04L 63/0861; H04W 12/06; H04W 12/72
USPC ............................................................ 705/71
See application file for complete search history.

(56) References Cited

U.S. PATENT DOCUMENTS

| | | | | |
|---|---|---|---|---|
| 2014/0289116 | A1 | 9/2014 | Polivanyi | |
| 2016/0241403 | A1* | 8/2016 | Lindemann | H04L 63/0861 |
| 2018/0212782 | A1* | 7/2018 | Csik | G06F 21/64 |
| 2019/0197222 | A1 | 6/2019 | Clark et al. | |
| 2020/0065463 | A1* | 2/2020 | Ryu | G06V 40/18 |
| 2020/0089867 | A1* | 3/2020 | Kim | H04L 9/3271 |
| 2020/0159966 | A1* | 5/2020 | Sibert | H04L 9/3247 |
| 2020/0267553 | A1* | 8/2020 | Wagner | G06F 21/32 |
| 2020/0382494 | A1* | 12/2020 | Park | H04L 9/3247 |
| 2023/0066754 | A1* | 3/2023 | Prasad | H04L 9/3231 |

OTHER PUBLICATIONS

Piel et al. "FIDO Authentication and EMV 3-D Secure: Using FIDO for Payment Authentication", 2020 FIDO Alliance, Sep. 2020 , 8 pages (Year: 2020).*
International Search Report for corresponding application PCT/FR2022/051513 filed Jul. 27, 2022; Mail date Oct. 20, 2022.

* cited by examiner

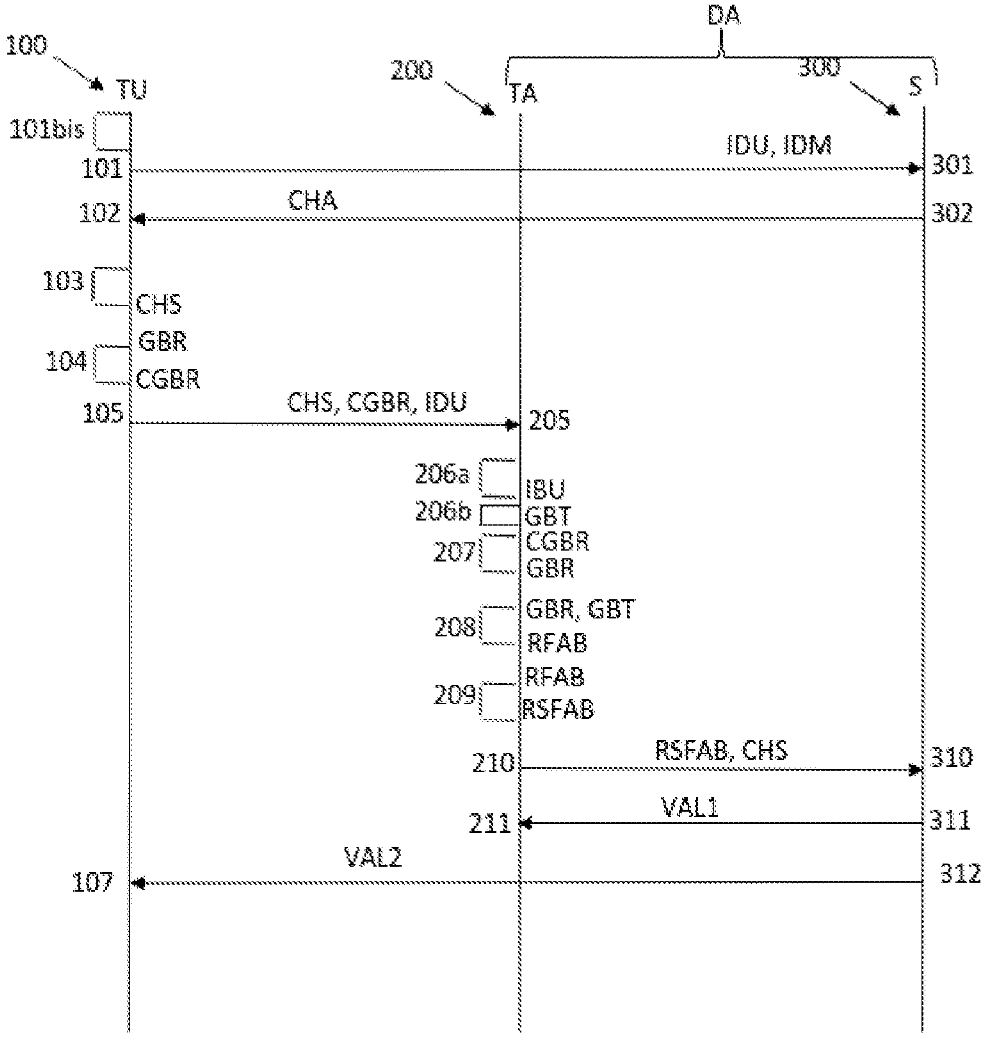
DA
100
TU
200
TA
300
S
101bis
101
IDU, IDM
301
102
CHA
302
103
CHS
GBR
104
CGBR
105
CHS, CGBR, IDU
205
206a
IBU
206b
GBT
207
CGBR
GBR
208
GBR, GBT
RFAB
209
RFAB
RSFAB
210
RSFAB, CHS
310
211
VAL1
311
107
VAL2
312

METHOD FOR STRONG ASYNCHRONOUS AUTHENTICATION AND TERMINAL CONFIGURED TO IMPLEMENT SAID METHOD

TECHNICAL FIELD

The present disclosure relates to the field of authentication methods and devices, and in particular for dematerialized payment.

BACKGROUND

It is known to use a strong authentication method, i.e. an authentication which combines at least two factors of different type among three types of possible factors, knowledge, possession and inherence, for the dematerialized payment via a mobile terminal, for example the mobile telephone of a user, configured to communicate with a payment terminal via a communication technology of the NFC type for example. To secure the communication between the two terminals, it is known, for example, to use, on the one hand, a knowledge factor that only the user knows, for example a PIN code known only by the user and entered by the latter on the mobile telephone, and a possession factor on the other hand, only the user has, in this case a mobile phone to which is associated a combination of keys stored on the mobile telephone, and transmitted with the PIN code to the payment terminal, which is configured to verify, in particular via a server, both the possession factor and the knowledge factor at once. It is also known to use, instead of a possession factor, a specific biometric characteristic of the user, based on a recognition of a vocal, facial, or fingerprint characteristic. Thus, it is known to use a two-factor authentication method, from among the aforementioned three types of factors.

Authentication methods with two known factors use the same mobile terminal to simultaneously communicate the authentication factors. The use of this mobile terminal may be a constraint for the user (time to find it, take it out, turn it on, have it on hand, etc.). It is desirable to simplify and fluidize as much as possible the user experience, while guaranteeing the security of the transaction.

On the other hand, when the second factor is a biometric factor, the private nature of the personal data specific to the user should be taken into account in order to remain in accordance with the regulation on personal data.

Finally, it is desirable that the first authentication factor and the second authentication factor could be used to secure several successive transactions.

BRIEF SUMMARY

Hence, the disclosure aims to provide a solution to all or part of these problems.

To this end, the present disclosure relates to an asynchronous authentication method using a first authentication factor and a second biometric authentication factor to validate a transaction on a transaction site, between a user and an authentication device of the transaction site, the user being provided with a user terminal,

- the authentication device comprising a server and at least one authentication terminal, the server and the at least one authentication terminal being two entities distinct from the transaction site, the at least one authentication terminal comprising a device for acquiring user biometric information,
- the user terminal storing a reference biometric template of the user and an identifier of the user, the user terminal being configured to communicate with the server and with the at least one authentication terminal,
- the method comprising the following asynchronous steps implemented by the user terminal:
  - transmitting by the user terminal the identifier of the user to the server when a first communication condition depending on a position of the user terminal is met,
  - receiving by the user terminal a challenge originating from the server,
  - signing the challenge to produce a signed challenge that will enable the verification of the first authentication factor which is a possession factor
  - encrypting the reference biometric template to produce the cipher of the reference biometric template
  - transmitting to the at least one authentication terminal the signed challenge, the cipher of the reference biometric template, and the identifier of the user, to enable the production by the at least one authentication terminal of a result of the second biometric authentication factor.

According to these arrangements, the transaction is carried out in a secure manner and without any effort, for the user, other than allowing the acquisition of the user biometric information.

According to one implementation, the disclosure comprises one or more of the following features, alone or in a technically-feasible combination.

According to one implementation, the method comprises a step of enrolling the user, the enrolment step comprising recording on the user terminal the reference biometric template and the identification information of the user. This enrolment step may be carried out by the user directly on the user terminal, or at the site of the transaction on an enrolment terminal, with a transfer of the enrolment data, in particular the reference biometric template, on the terminal of the user.

According to one implementation, the method comprises a step of receiving a validation message of the transaction when the transaction has been validated by the server based on a signed biometric result transmitted to the server by the au at least one authentication terminal.

According to one implementation, the transaction is a payment.

According to one implementation, the authentication device comprises an identification terminal located on the transaction site, said identification terminal being configured to be detected by the user terminal when the user arrives at the transaction site.

According to one implementation, the first communication condition is determined by a detection of the identification terminal by the user terminal.

According to one implementation, the first communication condition is determined by a geolocated detection by the user terminal of a position of the user terminal relative to a position of the transaction site recorded on the user terminal.

According to one implementation, the identification terminal and the at least one authentication terminal are located on the transaction site but are not necessarily collocated.

According to one implementation, the user terminal is a mobile terminal, for example a laptop computer, or a tablet, or a smartphone, of the smartphone type, that the user could in particular carry in his/her pocket, or a smartwatch or a connected bracelet, that the user could carry on his/her hand.

According to one implementation, the transaction site is a store, for example a shopping mall, or an amusement park, a hotel, a camping, or a vacation resort.

According to one implementation, the transmission step comprises transmitting an identifier of the transaction site.

According to one implementation, the user terminal is configured to communicate wirelessly with the identification terminal and with the at least one authentication terminal, for example according to an NFC, BLE or WIFI type protocol.

According to one implementation, the method comprises the use of a third authentication factor.

According to one implementation, the user biometric information is one amongst a fingerprint of a finger, a fingerprint of several fingers, a palm print, a photograph of the face, a voice recording, a photograph of an iris of an eye, a photograph of an iris of each eye.

According to one implementation, the step of receiving by the user terminal comprises receiving a public key of the server and a public key of the at least one authentication terminal, the signature step being carried out with the public key of the server, and the step of encrypting the reference biometric template being carried out with the public key of the at least one authentication terminal.

According to one implementation, the step of transmitting to the at least one authentication terminal comprises transmitting the identification information of the user.

According to one implementation, the step of transmitting to the at least one authentication terminal the signed challenge and the cipher of the reference biometric template is repeated at least once.

According to these arrangements, the first authentication factor and the second biometric authentication factor are used to secure several successive transactions, without any effort for the user.

According to one aspect, the disclosure also relates to an asynchronous authentication method using a first authentication factor and a second biometric authentication factor to validate a transaction on a transaction site between a user and an authentication device of the transaction site, the user being provided with a user terminal,

- the authentication device comprising a server and at least one authentication terminal, the server and the at least one authentication terminal being two entities distinct from the transaction site
- the at least one authentication terminal comprising a device for acquiring user biometric information,
- the user terminal storing the reference biometric template, the user terminal being configured to communicate with the server, and with the at least one authentication terminal,
- the method comprising the following asynchronous steps implemented by the authentication terminal
  - receiving, from the user terminal, a signed challenge produced by the user terminal, a cipher of the reference biometric template, and an identifier of the user corresponding to the reference biometric template,
  - acquiring the user biometric information with the acquisition device of the at least one authentication terminal;
  - generating a test biometric template from the user biometric information acquired with the acquisition device of the authentication terminal;
  - decrypting the cipher of the reference biometric template and a plurality of ciphers of other reference biometric templates present in the at least one authentication terminal, to obtain the reference biometric template and a plurality of other reference biometric templates;
  - comparing the test biometric template with the reference biometric template and with each other reference biometric template of the plurality of other reference biometric templates, to obtain a result of the second biometric authentication factor, the result of the second biometric authentication factor comprising at least one piece of binary information, a recognition score, and the identifier of the user corresponding to the reference biometric template having obtained the recognition score;
  - signing the result of the second biometric authentication factor to obtain a signed result of the second biometric authentication factor,
  - transmitting to the server a message comprising the signed result of the second biometric authentication factor and the signed challenge.

According to one implementation, the method implemented by the authentication terminal comprises one or more of the following features, alone or in combination.

According to one implementation, the asynchronism of the steps of the method allows a variable delay to elapse between, on the one hand, the steps of transmitting to, or receiving by, the authentication terminal the cipher of the reference biometric template, and, on the other hand, the step of acquiring the user biometric information with the acquisition device of the at least one authentication terminal.

According to one implementation, the delay that could elapse may be equal to or longer than 1 second, or equal to or longer than one minute, and even equal to or longer than one hour.

According to these arrangements, the user thus has the time to determine the items that will be the object of the transaction.

According to one implementation, the recognition score is selected from a set of comparison scores obtained by comparing the test biometric template with the reference biometric template and with each other reference biometric template of the plurality of other reference biometric templates, the score being selected according to a determined criterion.

According to one implementation, the criterion is determined so as to select the highest or lowest score.

According to one implementation, the binary information depends on a comparison between the selected recognition score, a predetermined threshold, thereby indicating whether a positive authentication decision is made. Thus, for example, the binary information is equal to 1, if the selected recognition score is higher than the predetermined threshold.

According to one implementation, the method further comprises a step of receiving a validation message from the server when the transaction is confirmed by the server based on the result of the second biometric authentication factor.

According to one implementation, the method further comprises a step of receiving by the user terminal another validation message from the server when the transaction is confirmed by the server based on the result of the second biometric authentication factor.

According to one implementation, the validation message and the other validation message depend on the recognition score.

According to one implementation, the transmitted message comprises an encrypted concatenation of the signed result of the second biometric authentication factor and the signed challenge.

According to one implementation, the method further comprises a step of destroying the reference biometric template, and the test biometric template, and the acquired user biometric information and the biometric result and the signed biometric result.

According to these arrangements, the transaction is carried out in accordance with the regulation on the privacy of personal data.

According to one implementation, the destruction step is triggered according to another condition determined by a geolocated detection by the user terminal of a position of the user terminal relative to a position of the transaction site recorded on the user terminal.

According to one implementation, the decryption step is carried out with a private key of the at least one authentication terminal, and the step of signing the result of the second biometric authentication factor is carried out with the private key of the at least one authentication terminal, and the step of transmitting to the server comprises transmitting a public key of the at least one authentication terminal.

According to another aspect, the disclosure also relates to an asynchronous authentication method using a first authentication factor and a second biometric authentication factor for validating a transaction on a transaction site between a user and an authentication device of the transaction site, the user being provided with a user terminal,

- the authentication device comprising a server and at least one authentication terminal, the server and the at least one authentication terminal being two entities distinct from the transaction site,
- the at least one authentication terminal comprising a device for acquiring user biometric information,
- the user terminal storing the reference biometric template, the user terminal being configured to communicate with the server, and with the at least one authentication terminal,
- the method comprising the following asynchronous steps implemented by the server:
  - receiving identification information of the user from the user terminal;
  - transmitting a challenge to the user terminal,
  - receiving a message comprising a signed result of the second biometric authentication factor and the signed challenge originating from the authentication terminal.

According to one implementation, the method implemented by the server comprises one or more of the following features, alone or in combination.

According to one implementation, the method further comprises an asynchronous step of transmitting a validation message to the authentication terminal according to the result of the second biometric authentication factor.

According to one implementation, the method further comprises a step of transmitting a validation message to the user terminal according to the result of the second biometric authentication factor.

According to one implementation, the result of the second biometric authentication factor comprises a recognition score, and the validation message depends on the recognition score.

According to one implementation, the reception step also comprises the reception of an identification of the transaction site.

According to one implementation, the message received in the reception step comprises an encrypted concatenation of the signed result of the second biometric authentication factor and the signed challenge.

According to one implementation, the method further comprises a step of destroying the reference biometric template, and the test biometric template, and the acquired user biometric information and the biometric result and the signed biometric result.

According to these arrangements, the transaction is carried out in accordance with the regulation on the privacy of personal data.

According to one implementation, the destruction step is triggered according to another condition determined by a geolocated detection by the user terminal of a position of the user terminal relative to a position of the transaction site recorded on the user terminal.

According to another aspect, the disclosure also relates to an authentication terminal using a first authentication factor and a second biometric authentication factor to validate a transaction with a user terminal,

- the authentication terminal being configured to communicate with a server, the server and the authentication terminal being two distinct entities, the authentication terminal comprising a device for acquiring user biometric information,
- the user terminal storing the reference biometric template, the user terminal being configured to communicate with the server and with the authentication terminal,
- the authentication terminal being configured to implement the asynchronous steps of the method implemented by the authentication terminal according to one of the previously-described implementations.

According to another aspect, the disclosure also relates to a computer program product downloadable from a communication network and/or stored on a computer-readable medium and/or executable by a microprocessor, comprising program code instructions for the execution of the asynchronous steps of the method implemented by the user terminal, or of the method implemented by the authentication terminal; or of the method implemented by the server, according to one of the previously-described implementations, when it is executed on a computer.

According to still another aspect, the disclosure also relates to a user terminal comprising a processor configured to implement the asynchronous steps of the method implemented by the user terminal according to one of the previously-described implementations.

According to still another aspect, the disclosure also relates to an authentication terminal, the authentication terminal being configured to implement the asynchronous steps of the method implemented by the authentication terminal according to one of the previously-described implementations.

According to one embodiment, the authentication terminal uses a first authentication factor and a second biometric authentication factor to validate a transaction with a user terminal,

- the authentication terminal is configured to communicate with a server, the server and the authentication terminal are two distinct entities,
- the authentication terminal comprising a device for acquiring user biometric information,
- the user terminal storing the reference biometric template, the user terminal being configured to communicate with the server and with the authentication terminal,
- the authentication terminal is configured to implement the asynchronous steps of the method implemented by the authentication terminal according to one of the previously-described implementations.

According to one aspect, the disclosure relates to an asynchronous authentication method implemented by an authentication system comprising a user terminal, and an identification device comprising at least one authentication terminal and a server, the method using a first authentication factor and a second biometric authentication factor to validate a transaction on a transaction site, between a user and the authentication device of the transaction site, the user being provided with the user terminal, the server and the at least one authentication terminal being two entities distinct from the transaction site, the at least one authentication terminal comprising a device for acquiring user biometric information, the user terminal storing a reference biometric template of the user and an identifier of the user, the user terminal being configured to communicate with the server and with the at least one authentication terminal, the method implemented by the authentication system comprising the following asynchronous steps implemented by the user terminal:

transmitting by the user terminal the identifier of the user to the server when a first communication condition depending on a position of the user terminal is met, receiving by the user terminal a challenge originating from the server, signing the challenge to produce a signed challenge which will enable the verification of the first authentication factor which is a possession factor encrypting the reference biometric template to produce the cipher of the reference biometric template transmitting to the at least one authentication terminal the signed challenge, the cipher of the reference biometric template, and the identifier of the user, to enable the production by the at least one authentication terminal of a result of the second biometric authentication factor, the method implemented by the authentication system further comprising the following asynchronous steps implemented by the authentication terminal receiving, from the user terminal, a signed challenge produced by the user terminal, a cipher of the reference biometric template, and an identifier of the user corresponding to the reference biometric template, acquiring the user biometric information with the acquisition device of the at least one authentication terminal;

generating a test biometric template from the user biometric information acquired with the acquisition device of the authentication terminal;

decrypting the cipher of the reference biometric template and a plurality of ciphers of other reference biometric templates present in the at least one authentication terminal, to obtain the reference biometric template and a plurality of other reference biometric templates;

comparing the test biometric template with the reference biometric template and with each other reference biometric template of the plurality of other reference biometric templates, to obtain a result of the second biometric authentication factor, the result of the second biometric authentication factor comprising at least one binary information, a recognition score, and the identifier of the user corresponding to the reference biometric template having obtained the recognition score;

signing the result of the second biometric authentication factor to obtain a signed result of the second biometric authentication factor, transmitting to the server a message comprising the signed result of the second biometric authentication factor and the signed challenge, the method implemented by the authentication system further comprising the following asynchronous steps implemented by the server:

receiving user identification information originating from the user terminal;

transmitting a challenge to the user terminal, receiving a message comprising a signed result of the second biometric authentication factor and the signed challenge originating from the authentication terminal.

BRIEF DESCRIPTION OF THE DRAWING

For good understanding thereof, an embodiment and/or implementation of the disclosure is described with reference to the appended drawings representing, as a non-limiting example, an embodiment or implementation respectively of a device and/or of a method according to the disclosure. The same references in the drawings designate similar elements or elements whose functions are similar.

FIG. 1 is a schematic presentation of the steps of the method according to an embodiment of the disclosure.

DETAILED DESCRIPTION

In order to successfully simplify the user experience and to fluidize the validation of a transaction while guaranteeing the security of this validation, the main technical problem relates to the fact that the authentication factors are not present at the same time (asynchronous) or used in the same place during the transaction.

In a complementary manner, when the second authentication factor is a biometric factor, the need to comply with the private nature of this factor is essential, that is to say to leave the biometric data (the template(s) of the biometric factor) stored in a personal device under the control of the user, as long as they are not essential.

Additionally, the first authentication factor should also be used to successively carry out several secure transactions on the same transaction site, in particular when the considered sites are of the "amusement park" type, "hotel", "camping", or "vacation resort", type.

Thus, the disclosure relates to an asynchronous authentication method 100 using a first authentication factor and a second biometric authentication factor to validate a transaction on a transaction site, between a user and an authentication device DA of the transaction site.

In particular, the transaction site is a store, for example a shopping mall, or an amusement park, a hotel, a camping, or a vacation resort.

More particularly, the transaction is a payment.

The user is provided with a user terminal TU, which stores a reference biometric template GBR; the user terminal TU is configured to communicate with the server S and with the at least one authentication terminal TA; in particular, the user terminal TU is configured to wirelessly communicate with the identification terminal and with the at least one authentication terminal, for example according to an NFC, BLE or WIFI type protocol.

In particular, the user terminal is a mobile terminal, for example a laptop computer, or a tablet, or a smartphone, that the user could carry in particular in his pocket, or a smartwatch or a connected bracelet, that the user could carry on his/her hand.

The authentication device DA comprises a server S and at least one authentication terminal TA; the server S and the at least one authentication terminal TA are two entities distinct from the transaction site.

The at least one authentication terminal TA comprises a device for acquiring user biometric information IBU.

In particular, the user biometric information IBU is one amongst the following biometric information: a fingerprint of a finger, a fingerprint of several fingers, a palm print, a photograph of the face, a voice recording, a photograph of an iris of an eye, a photograph of an iris of each eye.

The method according to the disclosure comprises a method 100, according to a first aspect of the disclosure represented schematically in FIG. 1, said method 100 comprising the following asynchronous steps implemented by the user terminal TU:

- transmitting 101 by the user terminal identification information of the user IDU to the server S when a first communication condition depending on a position of the user terminal TU is met, in particular, when the user terminal detects an identification terminal positioned on the site of the transaction, for example at an entrance of the site of the transaction. More particularly, said first communication condition is met when the user terminal TU detects, for example thanks to an integrated GPS device, that its position is close to a position of the transaction site, the position of the transaction site being recorded on the user terminal.

Optionally, the method 100 comprises a step 101*b* is of enrolling the user; the enrolment step 101*b* is comprises recording by the user, on the user terminal TU, the reference biometric template GBR and the identification information of the user IDU. The enrolment step 101*b* is further comprises, for example, recording the position(s) of the preferred transaction site(s) of the user. This enrolment step 101*b* is may be carried out by the user directly on the user terminal TU, or at the site of the transaction on an enrolment terminal, with a transfer of the enrolment data, in particular the reference biometric template GBR, on the terminal of the user TU.

More particularly, the transmission step 101 also comprises transmitting an identifier IDM of the transaction site, which possibly has also been recorded on the user terminal TU, for example during the enrolment step 101*b* is.

The method 100, according to the first aspect of the disclosure schematically represented in FIG. 1, further comprises the following asynchronous steps implemented by the user terminal TU:

- receiving 102 by the user terminal a challenge CHA originating from the server S; the challenge CHA is for example a particular message from the server S.
- signing 103 the challenge CHA to produce a signed challenge CHS; the signed challenge CHS will enable the verification of the first authentication factor which is a possession factor.
- encrypting 104 the reference biometric template GBR to produce the cipher of the reference biometric template CGBR.

According to an exemplary implementation, the reception step 102 comprises receiving by the user terminal TU a public key of the server S and a public key of the at least one authentication terminal TA, the signature step 103 being carried out with the public key of the server, and the step 104 of encrypting the reference biometric template GBR being carried out with the public key of the at least one authentication terminal TA.

The method 100, according to the first aspect of the disclosure schematically represented in FIG. 1, finally comprises the following asynchronous step implemented by the user terminal TU:

- transmitting 105 to the at least one authentication terminal the signed challenge CHS and the cipher of the reference biometric template CGBR to enable the production by the at least one authentication terminal of a result RFAB of the second biometric authentication factor FAB; the step 105 of transmitting to the at least one authentication terminal TA further comprises transmitting the identification information of the user IDU.

According to these arrangements, the transaction is carried out in a secure manner and without any effort, for the user, other than allowing the acquisition of the user biometric information.

Optionally, the step 105 of transmitting to the at least one authentication terminal the signed challenge CHS, the cipher of the reference biometric template CGBR and the identifier IDU is repeated at least once.

According to these arrangements, the first authentication factor and the second biometric authentication factor are used to secure several successive transactions, without any effort for the user.

It should be noted that the identification terminal and the at least one authentication terminal are located on the transaction site but are not necessarily collocated.

Optionally, the method 100 comprises the use of a third authentication factor.

The method according to the disclosure further comprises a method 200, according to a second aspect of the disclosure schematically represented in FIG. 1, said method 200 comprising the following asynchronous steps implemented by the authentication terminal TA:

- receiving 205 the signed challenge CHS, and the cipher of the reference biometric template CGBR, produced by the user terminal TU,
- acquiring 206*a* the user biometric information IBU with the acquisition device of the at least one authentication terminal TA;
- generating 206*b* a test biometric template GBT from the user biometric information IBU acquired with the acquisition device of the authentication terminal TA;
- decrypting 207 the cipher of the reference biometric template CGBR and a plurality of ciphers of other reference biometric templates present in the at least one authentication terminal TA, to obtain the reference biometric template GBR and a plurality of other reference biometric templates; the plurality of other reference biometric templates comprise in particular all of the reference biometric templates of the other users having entered the considered transaction site over a determined period of time.
- comparing 208 the test biometric template GBT with the reference biometric template and with the plurality of other reference biometric templates to obtain a result of the second biometric authentication factor RFAB, the result of the second biometric authentication factor RFAB comprising at least one piece of binary information and a recognition score, and the identifier of the user IDU corresponding to the cipher of the reference biometric template CGBR having obtained the recognition score.

The asynchronous nature of the steps of the methods 100, 200 is reflected in particular by the fact that a variable delay could elapse between, on the one hand, the steps of transmitting 105 to, or of receiving 205 by, the authentication terminal the cipher of the reference biometric template CGBR, and, on the other hand, the step 206 a of acquiring the user biometric information IBU with the acquisition device of the at least one authentication terminal TA. Thus, the delay that could elapse may be equal to or longer than 1 second, or equal to or longer than one minute, and even equal to or longer than one hour. During this period of time, the user thus has the time to determine the items that will be the object of the transaction.

The recognition score is selected from a set of comparison scores obtained by comparing the test biometric template with the reference biometric template and with each other reference biometric template of the plurality of other reference biometric templates, the score being selected according to a determined criterion.

Thus, for example, the highest score, or the lowest score, depending on the comparison function used, will be selected, so as to thus identify the user corresponding to the reference biometric template GBR which best corresponds to the test biometric template GBT.

Furthermore, by comparing the selected recognition score with a predetermined threshold, the comparison step 208 will determine whether a positive authentication decision is acceptable and will determine a binary value of the binary information accordingly; thus, for example, a piece of binary information equal to 1, respectively to 0, will indicate a positive, respectively negative, authentication decision.

The method 200, according to the second aspect of the disclosure schematically represented in FIG. 1, finally comprises the following asynchronous step implemented by the user terminal TA:

- signing 209 the result of the second biometric authentication factor RFAB to obtain a signed result of the second biometric authentication factor RSFAB;
- transmitting 210 to the server S a message comprising the signed result of the second biometric authentication factor RSFAB and the signed challenge CHS.

According to an exemplary implementation, the decryption step 207 is carried out with a private key of the at least one authentication terminal TA, and the step 209 of signing the result of the second biometric authentication factor RFAB is also carried out with the private key of the at least one authentication terminal; the step 210 of transmitting to the server comprises transmitting the public key, corresponding to said private key, of the at least one authentication terminal TA.

Optionally, the transmitted message 210 comprises an encrypted concatenation of the signed result of the second biometric authentication factor RSFAB and the signed challenge CHS. According to these arrangements, the security of the transaction is enhanced.

Also optionally, the method 200, according to the second aspect of the disclosure, further comprises a step 211 of receiving a validation message VAL1 from the server S when the transaction is confirmed by the server S based on the result of the second biometric authentication factor RFAB, in particular based on the recognition score.

Optionally, the method 100, according to the first aspect of the disclosure, further comprises a step 107 of receiving another validation message VAL2 from the server S when the transaction is confirmed by the server S based on the result of the second biometric authentication factor RFAB, in particular based on the recognition score.

According to an exemplary implementation, the method 200, according to the second aspect of the disclosure, further comprises a step of destroying the reference biometric template, and the test biometric template, and the acquired user biometric information and the biometric result and the signed biometric result.

In particular, the destruction step is triggered according to another condition determined by a geolocated detection by the user terminal of a position of the user terminal relative to a position of the transaction site recorded on the user terminal.

According to these arrangements, the transaction is carried out in accordance with the regulation on the privacy of personal data.

The method according to the disclosure further comprises a method 300, according to a third aspect of the disclosure schematically shown in FIG. 1, said method 300 comprising the following asynchronous steps implemented by the server S:

- receiving 301 identification information of the user IDU originating from the user terminal TU;
- transmitting 302 a challenge CHA to the user terminal TU,
- receiving 310 a message comprising a signed result of the second biometric authentication factor RSFAB and the signed challenge CHS originating from the authentication terminal TA.

Optionally, the method 300 further comprises the following asynchronous steps implemented by the server S:

- transmitting 311 a validation message VAL1 to the authentication terminal TA according to the result of the second biometric authentication factor RFAB.
- transmitting 312 a validation message VAL2 to the user terminal TU according to the result of the second biometric authentication factor RFAB.

As indicated hereinbefore, optionally the method according to the disclosure comprises using a third authentication factor, for example a second biometric factor, such as a print of the palm of the hand of the user. According to an exemplary implementation of this particular mode, the enrolment step 101*b* is comprises recording on the user terminal TU a second reference biometric template from the palm of the user, and the method further comprises a step of validating the payment, after the step of detecting and recognizing the second authentication factor; during this validation step, the third authentication factor, i.e. the second biometric factor, is recognized by the authentication terminal according to a process similar to that implemented for the recognition of the first biometric factor, following the presentation by the user of the palm of his/her hand to a second device for acquiring the second biometric factor.

According to another aspect, the disclosure also relates to a computer program product downloadable from a communication network and/or stored on a computer-readable medium and/or executable by a microprocessor, comprising program code instructions for the execution of the asynchronous steps of the method 100, 200, or 300 according to one of the previously-described implementation modes, when it is executed on a computer.

According to still another aspect, the disclosure also relates to a user terminal TU comprising a processor configured to implement the asynchronous steps of the method 100 according to the previously-described first aspect of the disclosure.

According to still another aspect, the disclosure also relates to an authentication terminal TA using a first authentication factor and a second biometric authentication factor to validate a transaction with a terminal user TU, the authentication terminal TA being configured to implement the asynchronous steps of the method 200 according to the previously-described second aspect of the disclosure.

According to another aspect, the disclosure relates to an asynchronous authentication method implemented by an authentication system comprising a user terminal TU, and an identification device DA comprising at least one authentication terminal TA and a server S, the method using a first authentication factor and a second biometric authentication factor to validate one transaction on a transaction site, between a user and the authentication device DA of the transaction site, the user being provided with the user terminal TU, the server S and the at least one authentication terminal TA being two entities distinct from the transaction site, the at least one authentication terminal TA comprising a device for acquiring user biometric information IBU, the user terminal TU storing a reference biometric template GBR of the user and an identifier of the user IDU, the user terminal TU being configured to communicate with the server S and with the at least one authentication terminal TA, the method implemented by the authentication system comprising the following asynchronous steps implemented by the user terminal TU:

transmitting 101 by the user terminal the identifier of the user IDU to the server S when a first communication condition depending on a position of the user terminal TU is met, receiving 102 by the user terminal a challenge CHA originating from the server S, signing 103 the challenge CHA to produce a signed challenge CHS which will enable the verification of the first authentication factor which is a possession factor encrypting 104 the reference biometric template GBR to produce the cipher of the reference biometric template CGBR transmitting 105 to the at least one authentication terminal TA the signed challenge CHS, the cipher of the reference biometric template CGBR, and the identifier of the user IDU, to enable the production by the at least one authentication terminal of a result RFAB of the second biometric authentication factor, the method implemented by the authentication system further comprising the following asynchronous steps implemented by the authentication terminal TA receiving 205, from the user terminal TU, a signed challenge CHS produced by the user terminal TU, a cipher of the reference biometric template CGBR, and an identifier of the user IDU corresponding to the reference biometric template GBR, acquiring 206*a* the user biometric information IBU with the acquisition device of the at least one authentication terminal TA;

generating 206*b* a test biometric template GBT from the user biometric information IBU acquired with the acquisition device of the authentication terminal TA;

decrypting 207 the cipher of the reference biometric template CGBR and a plurality of ciphers of other reference biometric templates present in the at least one authentication terminal TA, to obtain the reference biometric template GBR and a plurality of other reference biometric templates;

comparing 208 the test biometric template GBT with the reference biometric template GBR and with each other reference biometric template of the plurality of other reference biometric templates, to obtain a result of the second biometric authentication factor RFAB, the result of the second biometric authentication factor RFAB comprising at least one piece of binary information, a recognition score, and the identifier of the user IDU corresponding to the reference biometric template GBR having obtained the recognition score;

signing 209 the result of the second biometric authentication factor RFAB to obtain a signed result of the second biometric authentication factor RSFAB, transmitting 210 to the server S a message comprising the signed result of the second biometric authentication factor RSFAB and the signed challenge CHS, the method implemented by the authentication system further comprising the following asynchronous steps implemented by the server S:

receiving 301 identification information of the user IDU originating from the user terminal TU;

transmitting 302 a challenge CHA to the user terminal TU, receiving 310 a message comprising a signed result of the second biometric authentication factor RSFAB and the signed challenge CHS originating from the authentication terminal TA.

The invention claimed is:

1. An asynchronous authentication method using a first authentication factor and a second biometric authentication factor to validate a transaction on a transaction site, between a user and an authentication device of the transaction site, the user being provided with a user terminal, the authentication device comprising a server(s) and at least one authentication terminal, the server(s) and the at least one authentication terminal being two entities distinct from the transaction site, the at least one authentication terminal comprising a device for acquiring user biometric information, the user terminal storing a reference biometric template of the user and an identifier of the user, the user terminal being configured to communicate with the server(s) and with the at least one authentication terminal, the method comprising the following asynchronous steps implemented by the user terminal:

transmitting by the user terminal the identifier of the user to the server(s) when a first communication condition depending on a position of the user terminal is met, receiving by the user terminal a challenge originating from the server(s), signing the challenge to produce a signed challenge that will enable the verification of the first authentication factor which is a possession factor encrypting the reference biometric template to produce the cipher of the reference biometric template transmitting the signed challenge, the cipher of the reference biometric template, and the identifier of the user to the at least one authentication terminal, to enable the production of a result of the second biometric authentication factor by the at least one authentication terminal.

2. The method according to claim 1, the method comprising a step of receiving a validation message of the transaction when the transaction has been validated by the server(s) based on a signed biometric result transmitted to the server by the at least one authentication terminal.

3. The method according to claim 1, the authentication device comprising an identification terminal located on the transaction site, said identification terminal being configured to be detected by the user terminal when the user arrives at the transaction site.

4. The method according to claim 1 the user biometric information being one amongst a fingerprint of a finger, a fingerprint of several fingers, a palm print, a photograph of the face, a voice recording, a photograph of an iris of an eye, a photograph of an iris of each eye.

5. The method according to claim 1 the step of receiving by the user terminal comprises receiving a public key of the server(s) and a public key of the at least one authentication terminal, the signature step being carried out with the public key of the server, and the step of encrypting the reference biometric template being carried out with the public key of the at least one authentication terminal.

6. An asynchronous authentication method using a first authentication factor and a second biometric authentication factor to validate a transaction on a transaction site between a user and an authentication device of the transaction site, the user being provided with a user terminal, the authentication device comprising a server(s) and at least one authentication terminal, the server(s) and the at least one authentication terminal being two entities distinct from the transaction site the at least one authentication terminal comprising a device for acquiring user biometric information, the user terminal storing the reference biometric template, the user terminal being configured to communicate with the server(s), and with the at least one authentication terminal, the method comprising the following asynchronous steps implemented by the authentication terminal receiving, from the user terminal, a signed challenge produced by the user terminal, a cipher of the reference biometric template, and an identifier of the user corresponding to the reference biometric template, acquiring the user biometric information with the acquisition device of the at least one authentication terminal;

generating a test biometric template from the user biometric information acquired with the acquisition device of the authentication terminal;

decrypting the cipher of the reference biometric template and a plurality of ciphers of other reference biometric templates present in the at least one authentication terminal, to obtain the reference biometric template and a plurality of other reference biometric templates;

comparing the test biometric template with the reference biometric template and with each other reference biometric template of the plurality of other reference biometric templates, to obtain a result of the second biometric authentication factor, the result of the second biometric authentication factor comprising at least binary information, a recognition score, and the identifier of the user corresponding to the reference biometric template having obtained the recognition score;

signing the result of the second biometric authentication factor to obtain a signed result of the second biometric authentication factor, transmitting to the server(s) a message comprising the signed result of the second biometric authentication factor and the signed challenge.

7. The method according to claim 6, further comprising a step of receiving a validation message from the server(s) when the transaction is confirmed by the server(s) based on the result of the second biometric authentication factor.

8. The method according to claim 6, wherein the transmitted message comprises an encrypted concatenation of the signed result of the second biometric authentication factor and the signed challenge.

9. The method according to claim 6, further comprising a step of destroying the reference biometric template, and the test biometric template, and the acquired user biometric information and the biometric result and the signed biometric result.

10. The method according to claim 6, wherein the decryption step is carried out with a private key of the at least one authentication terminal, and wherein the step of signing the result of the second biometric authentication factor is carried out with the private key of the at least one authentication terminal, and wherein the step of transmitting to the server comprises transmitting a public key of the at least one authentication terminal.

11. An asynchronous authentication method using a first authentication factor and a second biometric authentication factor to validate a transaction on a transaction site between a user and an authentication device of the transaction site, the user being provided with a user terminal, the authentication device comprising a server(s) and at least one authentication terminal, the server(s) and the at least one authentication terminal being two entities distinct from the transaction site, the at least one authentication terminal comprising a device for acquiring user biometric information, the user terminal storing the reference biometric template, the user terminal being configured to communicate with the server(s), and with the at least one authentication terminal, the method comprising the following asynchronous steps implemented by the server(s):

receiving identification information of the user originating from the user terminal;

transmitting a challenge to the user terminal, receiving a message comprising a signed result of the second biometric authentication factor and the signed challenge originating from the authentication terminal.

12. The method according to claim 11, further comprising an asynchronous step of transmitting a validation message to the authentication terminal according to the result of the second biometric authentication factor.

13. The method according to claim 11, further comprising a step of transmitting a validation message to the user terminal according to the result of the second biometric authentication factor.

14. The method according to claim 11, further comprising a step of destroying the reference biometric template, and the test biometric template, and the acquired user biometric information and the biometric result and the signed biometric result.

15. An authentication terminal using a first authentication factor and a second biometric authentication factor to validate a transaction with a user terminal, the authentication terminal being configured to communicate with a server(s), the server(s) and the authentication terminal being two distinct entities, the authentication terminal comprising a device for acquiring user biometric information, the user terminal storing the reference biometric template, the user terminal being configured to communicate with the server(s) and with the authentication terminal,
the authentication terminal being configured to implement the asynchronous steps of the method according to claim 6.

* * * * *